(12) United States Patent
Rosin et al.

(10) Patent No.: US 12,129,187 B2
(45) Date of Patent: Oct. 29, 2024

(54) METHOD FOR CLEANING AQUEOUS WASTEWATER STREAMS LOADED WITH NITROBENZENE

(71) Applicant: Covestro Deutschland AG, Leverkusen (DE)

(72) Inventors: Thomas Rosin, Duisburg (DE); Peter Drinda, Krefeld (DE); Klaus Pilarczyk, Krefeld (DE)

(73) Assignee: Covestro Deutschland AG, Leverkusen (DE)

( * ) Notice: Subject to any disclaimer, the term of this patent is extended or adjusted under 35 U.S.C. 154(b) by 133 days.

(21) Appl. No.: 17/996,954

(22) PCT Filed: Apr. 24, 2021

(86) PCT No.: PCT/EP2021/060761
§ 371 (c)(1),
(2) Date: Oct. 24, 2022

(87) PCT Pub. No.: WO2021/219520
PCT Pub. Date: Nov. 4, 2021

(65) Prior Publication Data
US 2023/0234859 A1    Jul. 27, 2023

(30) Foreign Application Priority Data

Apr. 27, 2020 (EP) .................................... 20171565
Feb. 23, 2021 (EP) .................................... 21158732

(51) Int. Cl.
*C02F 1/10* (2023.01)
*B01D 3/26* (2006.01)
(Continued)

(52) U.S. Cl.
CPC ................ *C02F 1/008* (2013.01); *B01D 3/26* (2013.01); *B01D 3/346* (2013.01); *B01D 3/38* (2013.01);
(Continued)

(58) Field of Classification Search
CPC ........ C02F 1/008; C02F 1/10; C02F 2101/38; C02F 1/20; C02F 2209/38; C02F 2209/40;
(Continued)

(56) References Cited

U.S. PATENT DOCUMENTS 7,402,192 B2   7/2008   Buisson et al.
7,928,270 B2   4/2011   Penzel et al.
(Continued)

FOREIGN PATENT DOCUMENTS

CN    110104712 A    8/2019
ES      2212351 T3   7/2004
(Continued)

OTHER PUBLICATIONS

International Search Report, PCT/EP2021/060761, date of mailing: Jul. 21, 2021, Authorized officer: Valerie Thibault.
(Continued)

*Primary Examiner* — Renee Robinson
(74) *Attorney, Agent, or Firm* — Donald R. Palladino

(57) ABSTRACT

A process for purifying nitrobenzene-contaminated wastewater stream WW1 includes stripping WW1 with stripping gas SG1 in a stripping column to obtain wastewater stream WW2 containing reduced concentration of nitrobenzene relative to WW1 ($c_{NB,WW2}$), and purifying WW2 in a wastewater treatment plant, wherein a target value ($c_{NB,WW2,TARGET}$) is specified for the nitrobenzene concentration in WW2. A set of linear mathematical relationships is stored in a database for a combination of boundary conditions of
(Continued)

nitrobenzene concentration in WW1, temperature of WW1, and temperature of SG1. This set defines a range of concentrations of nitrobenzene in WW2 and includes a mathematical relationship corresponding to $c_{NB,WW2,TARGET}$, a mathematical relationship for a value of $c_{NB,WW2}$ corresponding to 98% of $c_{NB,WW2,TARGET}$, and a linear mathematical relationship for a value of $c_{NB,WW2}$ corresponding to 102% of $c_{NB,WW2,TARGET}$. The concentration of nitrobenzene is controlled in WW2 ($c_{NB,WW2}$) by adjusting the flow rate of SG1.

13 Claims, 4 Drawing Sheets

(51) Int. Cl.
    *B01D 3/34* (2006.01)
    *B01D 3/38* (2006.01)
    *B01D 3/42* (2006.01)
    *C02F 1/00* (2023.01)
    *C02F 101/38* (2006.01)

(52) U.S. Cl.
    CPC .................. *B01D 3/42* (2013.01); *C02F 1/10* (2013.01); *C02F 2101/38* (2013.01)

(58) Field of Classification Search
    CPC ..... C02F 2209/003; B01D 3/346; B01D 3/42; B01D 3/343
    See application file for complete search history.

(56) References Cited

U.S. PATENT DOCUMENTS

| | | |
|---|---|---|
| 9,771,290 B2 | 9/2017 | Knauf et al. |
| 2010/0082312 A1* | 4/2010 | Macharia ............. G05B 13/047 705/413 |
| 2016/0075582 A1* | 3/2016 | Knauf ...................... C02F 9/00 210/696 |

FOREIGN PATENT DOCUMENTS

| | | | |
|---|---|---|---|
| JP | 2011005391 A | 1/2011 | |
| TW | 201420518 A | 6/2014 | |
| WO | WO-2017105803 A1 * | 6/2017 | ............ B01D 11/00 |

OTHER PUBLICATIONS

Guo Yujie et al., Industrial Wastewater Treatment Engineering, East China University of Science and Technology Press, Oct. 2016, pp. 203-205.

* cited by examiner

METHOD FOR CLEANING AQUEOUS WASTEWATER STREAMS LOADED WITH NITROBENZENE

CROSS-REFERENCE TO RELATED APPLICATIONS

This application is a national stage application under 35 U.S.C. § 371 of PCT/EP2021/060761, filed Apr. 24, 2021, which claims the benefit of European Application No. 20171565.3, filed Apr. 27, 2020 and European Application No. 21158732.4, filed Feb. 23, 2021, each of which is incorporated herein by reference.

FIELD

The present invention relates to a process for purifying a wastewater stream WW1 contaminated with nitrobenzene, comprising (I) stripping of the wastewater stream WW1 with a stripping gas SG1 in a continuously operated stripping column to obtain a wastewater stream WW2 which contains nitrobenzene in a concentration reduced relative to WW1 ($c_{NB,WW2}$), (II) further purification of the wastewater stream WW2 in a wastewater treatment plant, wherein a target value ($c_{NB,WW2,TARGET}$) is specified for the concentration of nitrobenzene in the wastewater stream WW2, which is greater than zero but takes into account the requirements of the wastewater treatment plant for the maximum content of nitrobenzene in the wastewater streams supplied thereto, wherein, for at least one combination of specified boundary conditions of (a) nitrobenzene concentration in WW1, (b) the temperature of WW1, and (c) the temperature of SG1, a set of linear mathematical relationships of the type $\dot{m}_{SG1} = x \cdot \dot{m}_{WW1}$ is stored in a database, which linear mathematical relationships define a range of concentrations of nitrobenzene in WW2, wherein the set comprises, in addition to a mathematical relationship (0) which corresponds to the target value $c_{NB,WW2,TARGET}$, at least a first mathematical relationship (1) for a first value of $c_{NB,WW2}$, which corresponds to 98% of the target value $c_{NB,WW2,TARGET}$, and a second linear mathematical relationship (2) for a second value of $c_{NB,WW2}$, which corresponds to 102% of the target value $c_{NB,WW2,TARGET}$, and wherein the flow rate of the stripping gas is adapted to the flow rate of the wastewater WW1 such that the flow rate of WW1 is within a range of values ($\overline{AB}$) that is generated by the first mathematical relationship (1) and the second mathematical relationship (2) at the respective flow rate of WW1, and controlling the concentration of nitrobenzene in WW2 ($c_{NB,WW2}$) by adjusting the flow rate of stripping gas SG1 accordingly in the event of a measured actual value of this concentration which is outside a window of >98% to <102% of the target value.

BACKGROUND

Many production processes generate aqueous wastewater streams contaminated with organic compounds. Typically, such streams are initially pre-purified in the plant where they are generated and then sent to a wastewater treatment plant before they are released to the environment. Even the wastewater streams supplied to the wastewater treatment plant must have minimum requirements for purity, in particular to prevent the microorganisms employed in a biological wastewater treatment plant from being damaged or even killed by an excessively high concentration of organic compounds that are toxic to them. The operators of wastewater treatment plants therefore set increasingly stringent specifications for the purity of incoming wastewater, as a result of which on-site pre-purification plays an ever more important role. Such on-site pre-purification is in many cases carried out by means of stripping of the wastewater in a stripping column (also known as a wastewater stripper). The present invention is concerned with the operation of such a stripping column.

WO 2014/170309 A1 describes a process for treatment of alkaline wastewater formed in the washing of crude nitrobenzene obtained by nitration of benzene, wherein (i) the alkaline wastewater is heated in the absence of oxygen and at superatmospheric pressure to a temperature of 150° C. to 500° C.; (ii) the wastewater obtained in (i) is admixed with a base; (iii) the wastewater obtained in (ii) is further purified by stripping with a stripping gas and subsequently the stripping gas stream laden with impurities is cooled to a temperature of 10° C. to 60° C. The application does not go into details about the control of the stripping.

U.S. Pat. No. 7,402,192 B2 describes a process for continuous treatment of industrial wastewater which can contain various impurities. Wastewater from a refinery is given as the only specific example of a suitable industrial wastewater. The wastewater is introduced via at least one feed conduit (7, 13) into the upper portion of a stripping column (8) in which it flows downwards, wherein a steam stream is injected into this column (8) at such a height (at 14) that the wastewater and the steam flow in countercurrent in the column (8). The gases removed by the stripping of the wastewater by this steam are recovered at the top of the column (at 15) and the treated water is discharged at the bottom of the stripping column (8) (at 16). The process includes the feature of online determination of at least a section of the ultraviolet spectrum of impurities, in particular also the group formed by sulfides, ammonia and phenols. Measurement is carried out in conduits for supplying (7, 13) the wastewater or in the conduit for discharging the treated water (16) of the column (8). Mathematical processing of the measured intensities is used to determine at least one impurity product that is present in the samples withdrawn. As a function of the results thus obtained and by comparison with predetermined settings this information is represented in the form of electrical signals which control the feed throughputs in the stripping column of wastewater and steam.

SUMMARY

From an economic point of view it is of great importance to operate such a stripping column in a manner that is as energy-saving as possible without falling short of the specified requirements for the content of organics (especially those toxic to microorganisms) in the purified wastewater. A further objective is to configure the operation of a stripping column in a very user-friendly manner, i.e. in such a manner as to necessitate manual intervention by operating personnel only very rarely and, if so, ideally without needing to perform complex operations.

Achievement of these objectives requires efficient control of the stripping column used for the on-site purification. The present invention accordingly provides:

A process for purifying a wastewater stream WW1 contaminated with nitrobenzene which contains nitrobenzene (NB) in a concentration $c_{NB,WW1}$, comprising:
  (I) stripping the wastewater stream WW1 with a stripping gas SG1 in a continuously operated stripping column to obtain a wastewater stream WW2 which contains nitrobenzene in a concentration $c_{NB,WW2}$ (which is lower than $c_{NB,WW1}$) and a stripping gas SG2 laden with nitrobenzene, wherein the wastewater stream WW1 is supplied to the stripping column at a flow rate $\dot{m}_{WW1}$ and a temperature $T_{WW1}$ and the stripping gas SG1 is supplied to the stripping column at a flow rate $\dot{m}_{SG1}$ and a temperature $T_{SG1}$, and wherein the concentration of nitrobenzene in the wastewater stream WW2 $c_{NB,WW2}$ is measured at a measuring point continuously or at intervals (but in particular at least upon a change in the flow rate $\dot{m}_{WW1}$); and (II) purifying the wastewater stream WW2 in a wastewater treatment plant to obtain a purified wastewater stream WW3 which contains nitrobenzene in a concentration $c_{NB,WW3}$ (which is lower than $c_{NB,WW2}$), wherein the concentration of nitrobenzene in the wastewater stream WW2 supplied to the wastewater treatment plant must not exceed a predetermined maximum value $c_{NB,WW2,MAX}$ and a target value $c_{NB,WW2,TARGET}$ is specified for the concentration of nitrobenzene in the wastewater stream WW2 $c_{NB,WW2}$ which is greater than zero and is specified to a value within a target range defined by the condition $$0.50 \cdot c_{NB,WW2,MAX} \leq c_{NB,WW2,TARGET} \leq 0.95 \cdot c_{NB,WW2,MAX};$$

wherein the operation of the stripping column comprises:
(i) continuously supplying the stripping gas SG1 and the wastewater stream WW1 to the stripping column, wherein for at least one combination of specified boundary conditions (a) $c_{NB,WW1}$, (b) the temperature $T_{WW1}$, and (c) the temperature $T_{SG1}$, a set of linear mathematical relationships of the type $$\dot{m}_{SG1} = x \cdot \dot{m}_{WW1},$$

is stored in a database, each of which linear mathematical relationships corresponds to a concentration $c_{NB,WW2}$, so that the set of linear mathematical relationships defines a range of concentrations $c_{NB,WW2}$, wherein the set of linear mathematical relationships comprises, in addition to a mathematical relationship (0) which corresponds to the target value $c_{NB,WW2,TARGET}$, at least a first linear mathematical relationship (1) for a first value of $c_{NB,WW2}$, which corresponds to 98% of the target value $c_{NB,WW2,TARGET}$, and a second linear mathematical relationship (2) for a second value of $c_{NB,WW2}$, which corresponds to 102% of the target value $c_{NB,WW2,TARGET}$, and wherein the flow rate $\dot{m}_{SG1}$ is selected for a flow rate $\dot{m}_{WW1}(t_i)$ occurring at a time $t_i$ in such a way (wherein the flow rate $\dot{m}_{SG1}$ is adapted to the flow rate $\dot{m}_{WW1}(t_i)$ in such a way) that the flow rate $\dot{m}_{SG1}$ is within a range of values ($\overline{AB}$) that is generated by the first mathematical relationship (1) and the second mathematical relationship (2) at the flow rate $\dot{m}_{WW1}(t_i)$ occurring at the time $t_i$;

(ii) controlling the concentration $c_{NB,WW2}$
by reducing the flow rate of stripping gas SG1 $\dot{m}_{SG1}$ in the event that an actual concentration $c_{NB,WW2,ACTUAL}$ of nitrobenzene in the wastewater WW2 measured at the measuring point is equal to or less than $0.98 \cdot c_{NB,WW2,TARGET}$
and by increasing the flow rate of stripping gas SG1 $\dot{m}_{SG1}$ in the event that an actual concentration $c_{NB,WW2,ACTUAL}$ of nitrobenzene in the wastewater WW2 measured at the measuring point is equal to or greater than $1.02 \cdot c_{NB,WW2,TARGET}$.

It has surprisingly been found that the objectives mentioned can be achieved or are at least approximately achieved when the stripper column is not controlled in such a way that the purity to be achieved therewith is "the very highest possible" (i.e. $c_{NB,WW2}$ is the very lowest possible, ideally below the limit of detection) but rather when a value for $c_{NB,WW2}$ that is greater than "zero" (i.e. in this context: that is above the limit of detection) is deliberately tolerated and is even up to 95% of the maximum allowable value specified by the operator of the wastewater treatment plant (which is likewise greater than zero), and this value is subjected to control by means of measurements performed continuously or at intervals and, if required, changes to the amount of stripping gas supplied to the stripping column per unit 1.0 time derived therefrom. From the standpoint of environmental protection all that ultimately matters is that the wastewater discharged into the environment, i.e. generally the wastewater leaving the wastewater plant, has the highest possible purity but at least meets the legal requirements to be applied in the individual case; the question of where precisely this purity is achieved, whether largely in on-site pre-purification or in the wastewater treatment plant itself, is in this context only of minor importance or even inconsequential. However, it has been found in the context of the present invention that from an economic standpoint it can be crucially important to divide the altogether achieved degree of purification over the different purification stages in a particular way (naturally while observing applicable boundary conditions, such as the abovementioned requirements of the operators of wastewater treatment plants). The process according to the invention takes this finding into account by providing a control which makes this possible in an efficient manner.

It goes without saying that the wastewater stream WW1 to be purified which is contaminated "with nitrobenzene" may also comprise one or more further organic compounds; this does not depart from the scope of the present invention. In the case of aqueous wastewater streams from a process for producing nitrobenzene (especially acidic and alkaline wastewater; see hereinbelow), it is often the case that nitrobenzene is present in comparatively high concentrations relative to other organic impurities such as benzene and it is therefore advantageous to direct the control to nitrobenzene.

BRIEF DESCRIPTION OF THE DRAWINGS

In the appended drawings.

DETAILED DESCRIPTION

Figure 1:
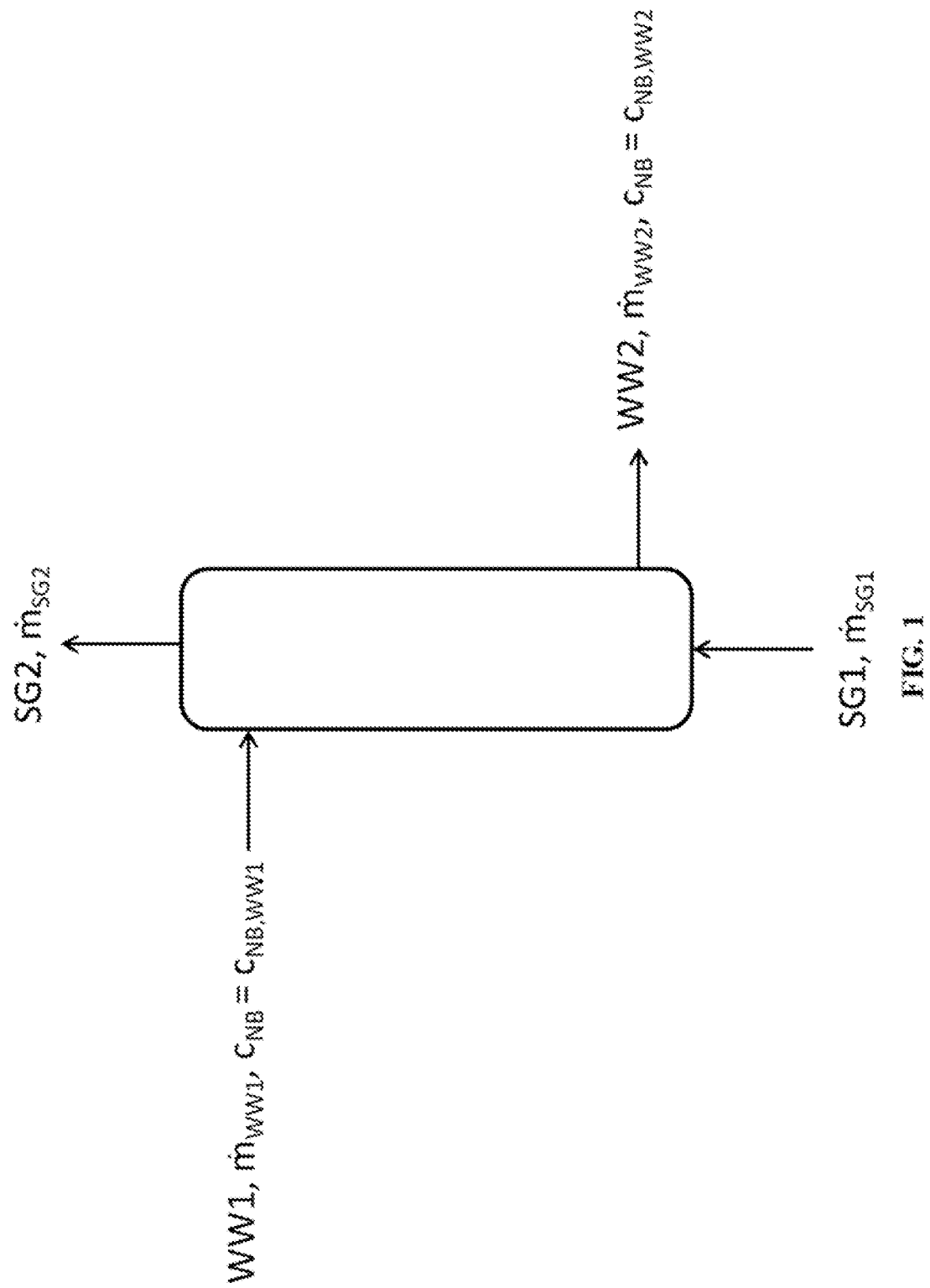
FIG. 1 a schematic representation of a stripping column employable according to the invention.

There follows firstly a brief summary of various possible embodiments.

In a first embodiment of the invention, which can be combined with all other embodiments, the stripping gas employed is steam and/or nitrogen.

In a second embodiment of the invention, which can be combined with all other embodiments, $c_{NB,WW2,ACTUAL}$ is determined by near-infrared spectroscopy or gas chromatography.

In a third embodiment of the invention, which is a particular configuration of the second embodiment, $c_{NB,WW2,ACTUAL}$ is determined by near-infrared spectroscopy.

In a fourth embodiment of the invention, which can be combined with all other embodiments, a value for $c_{NB,WW2}$ is determined independently at two or more (in particular at two) measuring points and the obtained measured values are used to form an average which is used as the value for $c_{NB,WW2}$,ACTUAL.

In a fifth embodiment of the invention, which is a particular configuration of the sixth embodiment, in the event of failure of one or more of the two or more measuring points, but not of all of the measuring points, only the at least one measuring point remaining functional is used, wherein the process comprises at least one such failure during the continuously performed stripping.

In a sixth embodiment of the invention, which can be combined with all other embodiments, provided these do not comprise at least one measuring point remaining functional like the fifth embodiment, in the event of a failure of all measuring points, the last value for the reduced or increased flow rate of stripping gas SG1 $\dot{m}_{SG1}$ to be supplied to the stripping column according to the controlling of step (ii) that was determined from the measured value of a measuring point before its failure, is increased by 5% to 10% and maintained until at least one of the measuring points is functional again.

In a seventh embodiment of the invention, which can be combined with all other embodiments, in step (i) the flow rate $\dot{m}_{SG1}$ is selected for the flow rate $\dot{m}_{WW1}(t_i)$ occurring at the time $t_i$ in such a way (the flow rate $\dot{m}_{SG1}$ is adapted to the flow rate $\dot{m}_{WW1}(t_i)$ in such a way) that the flow rate $\dot{m}_{SG1}$ is within a range of values that is generated by the mathematical relationship (0), which corresponds to the target value $c_{NB,WW2,TARGET}$, and the second mathematical relationship (2) at the flow rate $\dot{m}_{WW1}(t_i)$ occurring at the time $t_i$.

In an eighth embodiment of the invention, which represents an alternative to the seventh embodiment, in step (i) the flow rate $\dot{m}_{SG1}$ is selected for the flow rate $\dot{m}_{WW1}(t_i)$ occurring at the time $t_i$ in such a way (the flow rate $\dot{m}_{SG1}$ is adapted to the flow rate $\dot{m}_{WW1}(t_i)$ in such a way) that the flow rate $\dot{m}_{SG1}$ is within a range of values that is generated by the mathematical relationship (0), which corresponds to the target value $c_{NB,WW2,TARGET}$, and the first mathematical relationship (1) at the flow rate $\dot{m}_{WW1}(t_i)$ occurring at the time $t_i$.

In a ninth embodiment of the invention, which represents a further alternative to the seventh embodiment, the set of linear mathematical relationships includes a third linear mathematical relationship for a third value of $c_{NB,WW2}$, which corresponds to 99% of the target value $c_{NB,WW2,TARGET}$, and a fourth linear mathematical relationship for a fourth value of $c_{NB,WW2}$, which corresponds to 101% of the target value $c_{NB,WW2,TARGET}$, wherein in step (i) the flow rate $\dot{m}_{SG1}$ is selected for the flow rate $\dot{m}_{WW1}(t_i)$ occurring at the time $t_i$ in such a way (wherein the flow rate $\dot{m}_{SG1}$ is adapted to the flow rate $\dot{m}_{WW1}(t_i)$ in such a way) that the flow rate $\dot{m}_{SG1}$ is within a range of values that is generated by the third mathematical relationship and the fourth mathematical relationship at the flow rate $\dot{m}_{WW1}(t_i)$ occurring at the time $t_i$.

In a tenth embodiment of the invention, which can be combined with all other embodiments, a set of linear mathematical relationships is stored for each of at least two combinations of boundary conditions of (a) $c_{NB,WW1}$, (b) the temperature $T_{WW1}$, and (c) the temperature $T_{SG1}$, wherein at least the temperature $T_{SG1}$ differs in the at least two combinations of boundary conditions.

In a eleventh embodiment of the invention, which can be combined with all other embodiments, the wastewater stream to be purified is obtained in the washing of a nitrobenzene phase, wherein the nitrobenzene phase is obtained by nitration of benzene with nitric acid in the presence of sulfuric acid followed by separation of an aqueous sulfuric acid phase.

In a twelfth embodiment of the invention, which is a particular configuration of the eleventh embodiment, the washing of the nitrobenzene phase comprises three stages, wherein the first stage comprises washing with water, the second stage comprises washing with an aqueous base solution (in particular aqueous sodium hydroxide) and the third stage comprises washing with water, wherein wastewater is generated in each of the three stages, and at least one of these is purified in the stripping column as wastewater stream WW1.

In a thirteenth embodiment of the invention, which is a particular configuration of the eleventh embodiment, the third stage generates a wastewater which is employed as a constituent of a washing water employed in the second and/or first stage, wherein the first and/or the second stage generated wastewater that is purified in the stripping column as wastewater stream WW1.

In a fourteenth embodiment of the invention, which can be combined with all other embodiments, the maximum value $c_{NB,WW2,MAX}$ is in the range from 2.0 ppm to 10 ppm based on the total mass of WW2.

In a fifteenth embodiment of the invention, which can be combined with all other embodiments, $c_{NB,WW2}$ is measured continuously or at intervals of not more than 6 h, preferably not more than 3 h, particularly preferably not more than 1 h.

The embodiments briefly outlined above and further possible configurations of the invention shall be more particularly elucidated hereinbelow. All of the embodiments and further configurations may be combined with one another as desired unless explicitly stated otherwise or unambiguously apparent from the context.

The actual stripping of the wastewater stream WW1 with a stripping gas SG1 in step (I) may in principle be carried out as known to those skilled in the art. The stripping gas used is preferably steam and/or nitrogen, particularly preferably steam. As shown in FIG. 1 the wastewater to be purified (WW1 in the terminology of the present invention; flow rate $\dot{m}_{WW1}$, concentration of nitrobenzene, $c_{NB}$, is $c_{NB,WW1}$) is in particular supplied at the column top and a suitable stripping gas (SG1 in the terminology of the present invention; flow rate $\dot{m}_{SG1}$) is run through the stripping column in countercurrent from below. The water depleted in nitrobenzene is withdrawn at the bottom of the column (WW2 in the terminology of the present invention; flow rate $\dot{m}_{WW2}$, concentration of nitrobenzene $c_{NB,WW2}$). A stripping gas stream enriched in nitrobenzene (SG2 in the terminology of the present invention) is obtained at the top of the column. This stream SG2 is preferably condensed and sent for further use. The further use can be of a chemical nature, where the condensate obtained in the condensation is supplied to a chemical process. However, it is also possible to burn the obtained condensate, whose organics content is substantially higher than that of WW1, and to employ the liberated heat as an energy carrier, for example for production processes.

The concentration $c_{NB,WW2}$ may in principle be determined by all methods known to those skilled in the art for the purpose of detecting nitrobenzene in aqueous solution, in particular by near-infrared spectroscopy or gas chromatography, wherein near-infrared spectroscopy is preferred. In general, all methods provide results that are consistent in the context of a precision required for the purposes of the present invention. In the unlikely event of a significant discrepancy between different methods of measurement, the value determined by near-infrared spectroscopy is definitive for the purposes of the present invention. The measurement of $c_{NB,WW2}$ is especially carried out continuously or at intervals of not more than 6 hours, preferably not more than 3 hours, particularly preferably not more than 1 hour.

It is possible to establish more than one measuring point, in particular (precisely) two measuring points, to determine the concentration $c_{NB,WW2}$. The use of more than two measuring points is generally unnecessary but is of course also possible. The two or more measuring points independently of one another determine measured values, from which the average is calculated and used as the value for $c_{NB,WW2,ACTUAL}$. This increases accuracy and also allows continued operation of the process even in the case where one of the measuring points (not all) experience a failure as a consequence malfunction. In such a case the at least one measuring point remaining functional can simply continue to be used. If only a single measuring point in fact remains available it goes without saying that averaging can no longer be undertaken for the duration of the malfunction.

If—independently of whether precisely one or more measuring points are available—temporarily due to a fault no measuring point at all is available, it is preferred that the last value for the flow rate of stripping gas SG1 $\dot{m}_{SG1}$ to be supplied to the stripping column according to the controlling of step (ii) that was determined at a measuring point from its measured value for $c_{NB,WW2}$ before its failure, is increased by 5% to 10% and maintained until at least one of the measuring points is once again functional and can perform its task.

For a given stripping column the flow rate of stripping gas SG1 required for maintaining the desired purity of the wastewater WW2 depends on various factors, such as in particular:

1. magnitude of the flow rate WW1;
2. concentration of nitrobenzene in WW1;
3. temperature of WW1;
4. temperature of the stripping gas SG1.

Figure 2:
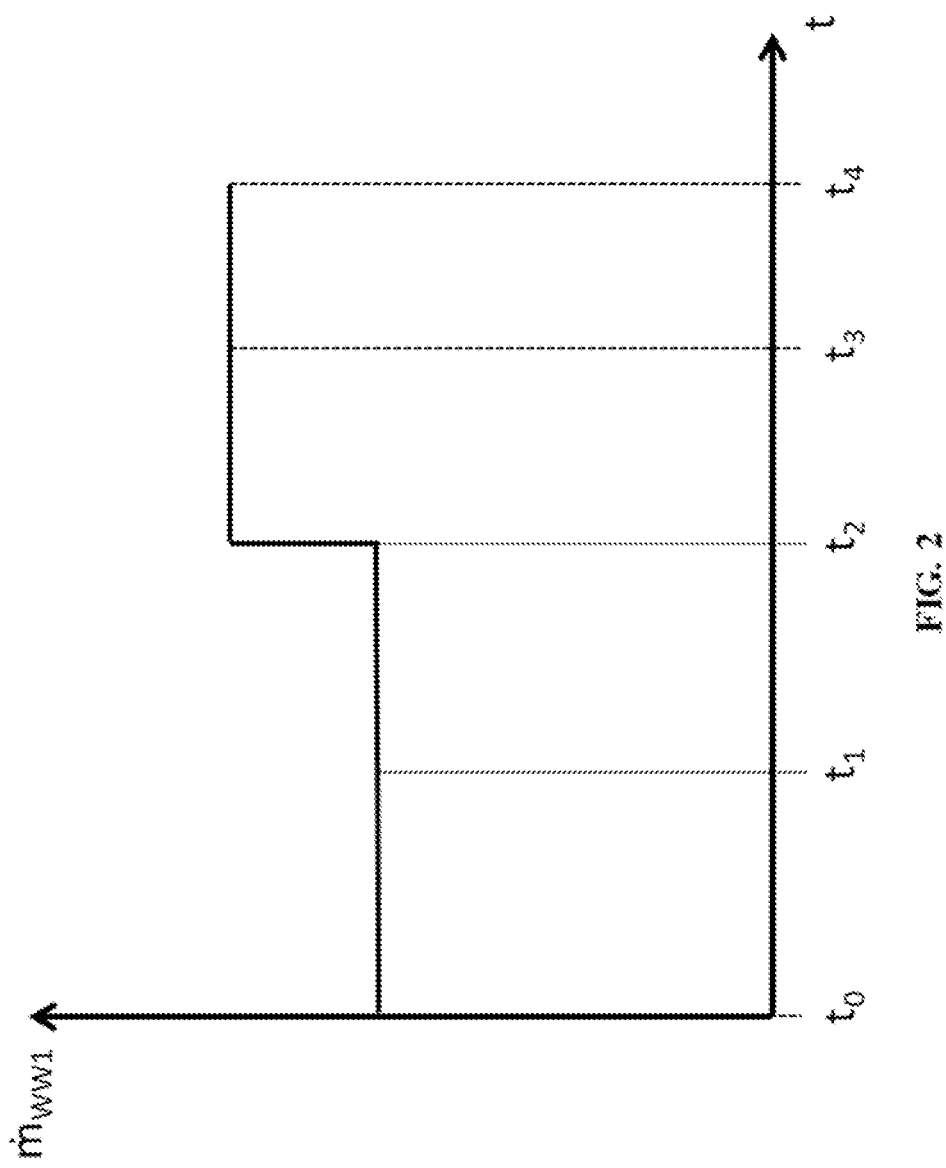
FIG. 2 a schematic representation of the change in $\dot{m}_{WW1}$ over a notional period $t_0$ to $t_4$ comprising the intermediate periods $t_0$ to $t_2$ and $t_2$ to $t_4$.

For a given process, factors 2 to 4 are generally subject at most to small variations and the main focus for the control is therefore the magnitude of the flow rate WW1. Changes to the flow rate are also referred to as a load change. A schematic diagram of such a load change is shown in FIG. 2. The figure shows a plot of the flow rate of wastewater WW1 over time t. Considered here is a period of $t_0$ to $t_4$, over which (at a time $t_2$) the flow rate of WW1, which is supplied to the wastewater stripping column, is significantly increased. Within the period of low load ($t_0$ to $t_2$) a time $t_i$, discussed in more detail below, is marked. The same applies to the period of high load ($t_2$ to $t_4$, there $t_3$). (The higher load period strictly begins immediately after $t_2$ if the load is instantaneously increased at time $t_2$. However, for the sake of simplicity the higher load period in the present discussion will be referred to as "$t_2$ to $t_4$," or "$t_2$-$t_4$".)

Against this background, the set of linear mathematical relationships is stored for at least one combination of specified boundary conditions of (a) $c_{NB,WW1}$, (b) the temperature $T_{WW1}$, and (c) the temperature $T_{SG1}$ in the context of the present invention. This means that a set of linear mathematical relationships is stored for at least one value for (a) $c_{NB,WW1}$ in combination with a value for (b) $T_{WW1}$ and in combination with a value for (c) $T_{SG1}$. Should it become apparent in operational practice that the stripping column may be advantageously operated with two or more combinations of values for (a) $c_{NB,WW1}$, (b) $T_{WW1}$ and (c) $T_{SG1}$, it is preferable to store a set of linear mathematical relationships for each of these combinations of values. This applies especially if the temperature of the wastewater stream is variable, i.e. if for example the wastewater arrives at the feed for the stripping column at a first temperature for a first period and at a second temperature distinct from the first temperature in a second period. In such a case a second set of linear mathematical relationships, which corresponds to the second temperature of WW1, is simply employed.

Thus, under these boundary conditions every linear mathematical relationship of the type $\dot{m}_{SG1} = x \cdot \dot{m}_{WW1}$ corresponds to a certain concentration of nitrobenzene in the wastewater leaving the stripping column $c_{NB,WW2}$. In other words: Under these boundary conditions the dependency of the flow rate of stripping gas required for purifying the wastewater WW1 on the amount of wastewater WW1 introduced is linear, wherein the slope of the straight line corresponds to the factor x in the linear mathematical relationship $\dot{m}_{SG1} = x \cdot \dot{m}_{WW1}$. This makes it possible to establish a set of such linear mathematical relationships which corresponds to a range of concentrations $c_{NB,WW2}$.

Figure 3:
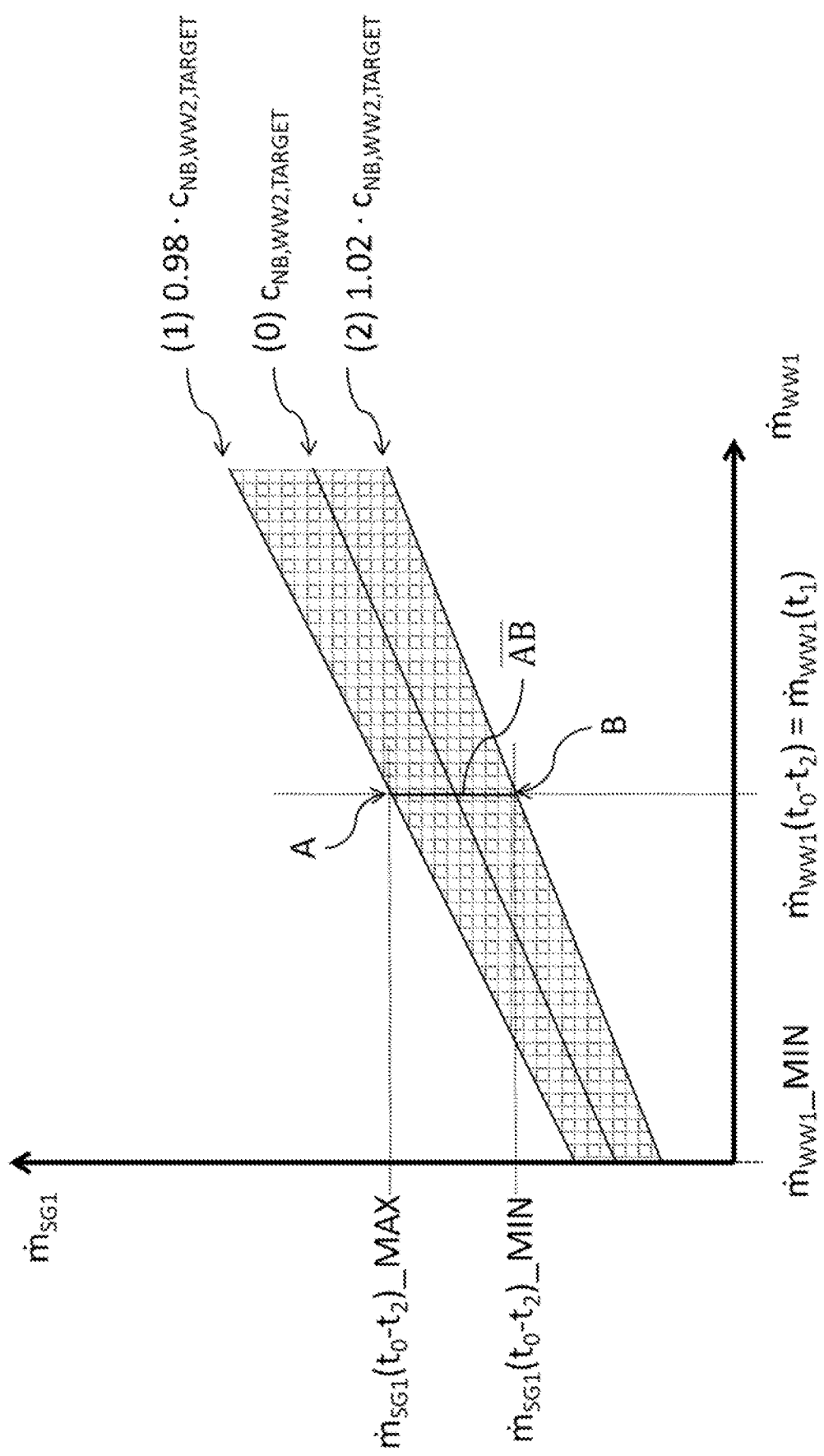
FIG. 3 a schematic representation of the relationships between the flow rates of SG1, WW1 and $c_{NB,WW2,TARGET}$ over the period $t_0$ to $t_2$.

FIG. 3 shows a schematic representation of a typical dependence of the required flow rate of stripping gas SG1 on the flow rate of wastewater WW1 supplied to the stripping column. Therein, $\dot{m}_{WW1}$_MIN denotes the minimum wastewater flow rate with which the stripping column can still be advantageously operated. The wastewater flow rate passed into the stripping column at time $t_1$ (cf. FIG. 2) ($\dot{m}_{WW1}(t_1)$) is shown. Since the flow rate of WW1 from $t_0$ to $t_2$ ($\dot{m}_{WW1}(t_0-t_2)$) is constant, $\dot{m}_{WW1}(t_1) = \dot{m}_{WW1}(t_0-t_2)$.

The data required to create such a graphic may be easily obtained from operational experience (preliminary tests at the selected boundary conditions of (a) $c_{NB,WW1}$, (b) $T_{WW1}$ and (c) $T_{SG1}$) and/or engineering calculations known to those skilled in the art. The dependence is linear, i.e. the function $\dot{m}_{SG1}(\dot{m}_{WW1})$ is a straight line whose slope corresponds to the value x in the linear mathematical relationship. According to the invention the set of linear mathematical relationships includes at least the three straight lines labeled (0), (1) and (2) shown in FIG. 1.

The straight line marked (0) corresponds to values of $\dot{m}_{SG1}$ which at the corresponding values of $\dot{m}_{WW1}$ (under the specified boundary conditions) result in a content of organic compounds in the wastewater WW2 leaving the stripping column which corresponds to the desired target value.

The line marked (1) corresponds to values of $\dot{m}_{SG1}$ which at the corresponding values of $\dot{m}_{WW1}$ (under the specified boundary conditions) result in a content of organic compounds in the wastewater WW2 leaving the stripping column which is 2% below the desired target value.

The line marked (2) corresponds to values of $\dot{m}_{SG1}$ which at the corresponding values of $\dot{m}_{WW1}$ (under the specified boundary conditions) result in a content of organic compounds in the wastewater WW2 leaving the stripping column which is 2% above the desired target value.

The straight lines (1) and (2) define a truncated cone which is indicated by the hatching.

The information upon which a graphic such as that shown in FIG. 3 is based is thus stored in a database as a set of linear mathematical relationships. The database itself is integrated into a process control system that runs the stripping column.

Time $t=t_1$ will now be considered: The flow rate of stripping gas SG1 may be selected in the range $\dot{m}_{SG1}(t_0\text{-}t_2)\_MIN$ to $\dot{m}_{SG1}(t_0\text{-}t_2)\_MAX$ These two values denote the minimum ($\dot{m}_{SG1}(t_0\text{-}t_2)\_MIN$) and maximum ($\dot{m}_{SG1}(t_0\text{-}t_2)\_MAX$) flow rate of stripping gas with which, at the wastewater amount $\dot{m}_{WW1}(t_1)=\dot{m}_{WW1}(t_0\text{-}t_2)$, the concentration of nitrobenzene in the wastewater WW2 can be kept within a range of ±2% around the target value according to the information stored in the database. This defines for the time $t_1$ the end points A and B of a range of values $\overline{AB}$, within which $\dot{m}_{SG1}$ may be selected at time $t_1$ (in general terms: at time $t_i$). This is what is meant by the requirement according to the invention that the flow rate $\dot{m}_{SG1}$ is selected for a flow rate $\dot{m}_{WW1}(t_i)$ occurring at a time $t_i$ in such a way (wherein the flow rate $\dot{m}_{SG1}$ is adapted to the flow rate $\dot{m}_{WW1}(t_i)$) that the flow rate $\dot{m}_{SG1}$ is within a range of values ($\overline{AB}$) that is generated by the first mathematical relationship (1) and the second mathematical relationship (2) at the flow rate $\dot{m}_{WW1}(t_i)$ occurring at the time $t_i$.

The flow rate $\dot{m}_{WW1}(t_i)$ can be selected in such a way that the amount of stripping gas introduced tends to be too high (i.e. is in the upper region of the truncated cone from FIG. 3), with the result that the controlling according to step (ii) tends to comprise a reduction in the flow rate of SG1.

However, the flow rate $\dot{m}_{WW1}(t_1)$ can also be selected in such a way that the amount of stripping gas introduced tends to be too low (i.e. is in the lower region of the truncated cone from FIG. 3), with the result that the controlling according to step (ii) tends to comprise an increase in the flow rate of SG1.

Finally, the flow rate $\dot{m}_{WW1}(t_i)$ can also be selected in such a way that the amount of stripping gas introduced is in a range above and below the ideal straight line (0), i.e. is in a central region of the truncated cone of FIG. 3, with the result that the controlling according to step (ii) tends to comprise a reduction or an increase in the flow rate of SG1 depending on the result of the measurements performed continuously or at intervals.

From the standpoint of user-friendliness, the first two options are preferred.

It goes without saying that the existing apparatus-related boundary conditions must be observed. For example, it will regularly be the case that in the context of the controlling according to step (ii) the amount of stripping gas SG1 cannot be varied to any desired extent but only within a particular specified range, for example by not more than 20%. This must be taken into account when selecting the flow rate $\dot{m}_{WW1}(t_i)$ according to step (i), i.e. the flow rate $\dot{m}_{WW1}(t_i)$ must be selected such that a feared departure from the corridor of ±2% around the target value for the concentration of nitrobenzene in WW2 can actually be compensated. This means for example that when using the second of the abovementioned options, the flow rate $\dot{m}_{WW1}(t_i)$ in step (i) must be selected in such a way that—for the recited example of a limitation of the variability of the stripping gas flow rate by up to 20%—in step (ii) an increase in the flow rate of SG1 by up to 20% is in fact sufficient to ensure the necessary correction.

Figure 4:
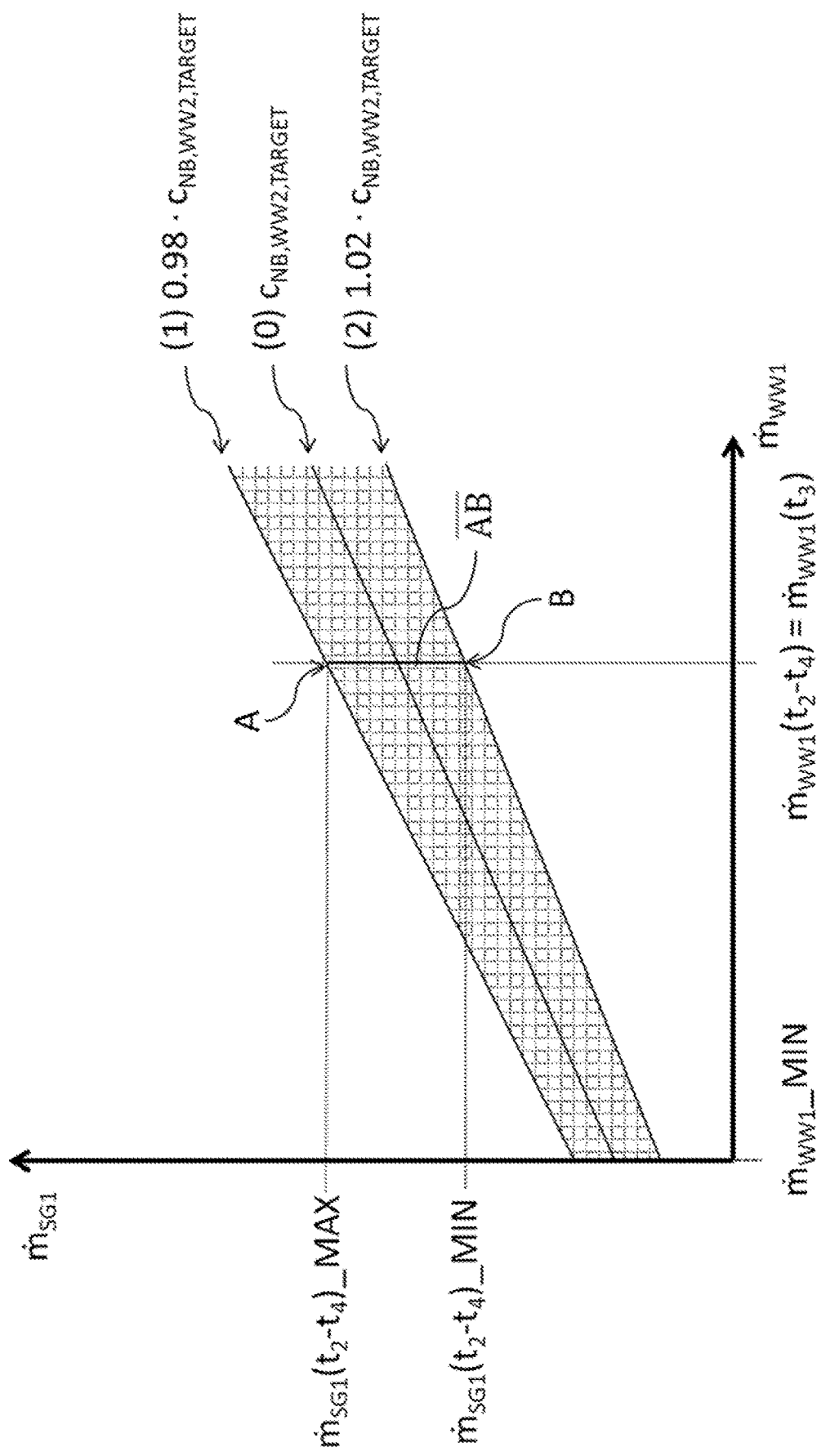
FIG. 4 a schematic representation of the relationships between the flow rates of SG1, WW1 and $c_{NB,WW2,TARGET}$ over the period $t_2$ to $t_4$.

FIG. 4 is a representation, analogous to FIG. 3, of the time $t_3$, which is in the period of higher load ($t_2$ to $t_4$). The flow rate of wastewater corresponding to the time $t_3$ is marked as $\dot{m}_{WW1}(t_3)$. Since the flow rate of wastewater WW1 in the period $t_2$ to $t_4$ is constant the following applies by analogy to FIG. 3: $\dot{m}_{WW1}(t_3)=\dot{m}_{WW1}(t_2\text{-}t_4)$. Here too there are minimum ($\dot{m}_{SG1}(t_2\text{-}t_4)\_MIN$) and maximum ($\dot{m}_{SG1}(t_2\text{-}t_4)\_MAX$) values for the stripping gas flow rate (range of values $\overline{AB}$) corresponding to the value for $\dot{m}_{WW1}(t_3)$.

The process according to the invention is suitable for the purification of aqueous wastewater streams from a process for producing nitrobenzene by nitration of benzene with nitric acid in the presence of sulfuric acid. Benzene, especially in the adiabatically operated nitration processes that are customary nowadays, is typically used in stoichiometric excess over nitric acid, such that it has to be removed in the course of workup of nitration product. The workup of the nitration product is typically accomplished by separating the reaction mixture present after nitration (nitration product), comprising nitrobenzene, unconverted benzene and sulfuric acid, into an aqueous sulfuric acid phase and an organic nitrobenzene phase in a first step, followed by a second step of a single-stage or multistage wash of the nitrobenzene phase, followed by a third step in which the excess benzene is separated from the washed nitrobenzene phase. The excess benzene is typically recycled into the nitration.

The second washing step preferably comprises three stages, a so-called acidic wash, a so-called alkaline wash and a so-called neutral wash. In the first stage, the nitrobenzene phase obtained in the phase separation is washed with water to wash out entrained or dissolved acid residues as far as possible. In the second stage, the organic washing product from the first stage obtained after separation of the phases is washed with an aqueous base solution, in particular sodium hydroxide solution, to neutralize any acid residues remaining in the nitrobenzene. In the third stage, the organic washing product of the second stage obtained after separation of the phases is finally washed with water. In each stage, separation of the phases generates not only the respective organic washing product but also wastewater which may be purified according to the invention as wastewater stream WW1.

The washing is preferably carried out in countercurrent such that the wastewater obtained in the third stage is used as a constituent of the washing liquid in the washing of the second and/or first stage. The process according to the invention is particularly suitable for purifying the wastewaters obtained in the first and/or second stage.

As already mentioned hereinabove, the cleaning process according to the invention is used for pre-purifying the wastewater stream WW1 in such a way that the obtained wastewater stream WW2 may be supplied to an (especially biological) wastewater treatment plant while observing the purity requirements specified by the operator thereof for the wastewater stream WW2. The present invention has the advantage of making it possible to control the stripping column in such a way that the content of nitrobenzene in the wastewater WW2 is not necessarily always the minimum possible but is relatively constant and always sufficiently below the specification limit of the operator of the wastewater treatment plant. The maximum value $c_{NB,WW2,MAX}$ specified by the operator of the wastewater treatment plant is for example in the range from 2.0 ppm to 10 ppm based on the total mass of WW2.

The invention described hereinabove features optimization of steam consumption and increases user-friendliness.

The invention claimed is:

1. A process for purifying a wastewater stream WW1 contaminated with nitrobenzene which contains nitrobenzene in a concentration $c_{NB,WW1}$, comprising:
   (I) stripping WW1 with a stripping gas SG1 in a continuously operated stripping column to obtain a wastewater stream WW2 which contains nitrobenzene in a concentration $c_{NB,WW2}$ in which $c_{NB,WW2} < c_{NB,WW1}$ and a stripping gas SG2 laden with nitrobenzene, wherein WW1 is supplied to the stripping column at a flow rate $\dot{m}_{WW1}$ and a temperature $T_{WW1}$ and SG1 is supplied to the stripping column at a flow rate $\dot{m}_{SG1}$ and a temperature $T_{SG1}$, and wherein $c_{NB,WW2}$ is measured at a measuring point continuously or at intervals; and
   (II) purifying WW2 in a wastewater treatment plant to obtain a purified wastewater stream WW3 which contains nitrobenzene in a concentration $c_{NB,WW3}$ in which $c_{NB,WW3} < c_{NB,WW2}$,
   wherein $c_{NB,WW2}$ does not exceed a predetermined maximum value $c_{NB,WW2,MAX}$ and a target value $c_{NB,WW2,TARGET}$ is specified for $c_{NB,WW2}$ which is greater than zero and is specified to a value within a target range defined by the condition $$0.50 \cdot c_{NB,WW2,MAX} \leq c_{NB,WW2,TARGET} \leq 0.95 \cdot c_{NB,WW2,MAX};$$

wherein the operation of the stripping column comprises:
   (i) continuously supplying SG1 and WW1 to the stripping column, wherein for at least one combination of boundary conditions (a) $c_{NB,WW1}$, (b) the temperature $T_{WW1}$, and (c) the temperature $T_{SG1}$, a set of linear mathematical relationships corresponding to:

$$\dot{m}_{SG1} = x \cdot \dot{m}_{WW1},$$

is stored in a database, each of which linear mathematical relationships corresponds to a concentration $c_{NB,WW2}$, so that the set of linear mathematical relationships defines a range of concentrations $c_{NB,WW2}$, wherein the set of linear mathematical relationships comprises, in addition to a mathematical relationship (0) which corresponds to $c_{NB,WW2,TARGET}$, at least a first linear mathematical relationship (1) for a first value of $c_{NB,WW2}$, which corresponds to 98% of $c_{NB,WW2,TARGET}$, and a second linear mathematical relationship (2) for a second value of $c_{NB,WW2}$, which corresponds to 102% of $c_{NB,WW2,TARGET}$, and
   wherein $\dot{m}_{SG1}$ is selected for a flow rate $\dot{m}_{WW1}(t_i)$ occurring at a time $t_i$ in such a way that $\dot{m}_{SG1}$ is within a range of values ($\overline{AB}$) that is generated by the first mathematical relationship (1) and the second mathematical relationship (2) at the flow rate $\dot{m}_{WW1}(t_i)$ occurring at the time $t_i$; and
   (ii) controlling $c_{NB,WW2}$
   by reducing $\dot{m}_{SG1}$ in the event that an actual concentration $c_{NB,WW2,ACTUAL}$ of nitrobenzene in the wastewater WW2 measured at the measuring point is equal to or less than $0.98 \cdot c_{NB,WW2,TARGET}$ and
   by increasing $\dot{m}_{SG1}$ in the event that $c_{NB,WW2,ACTUAL}$ measured at the measuring point is equal to or less than $1.02 \cdot c_{NB,WW2,TARGET}$.

2. The process as claimed in claim 1, wherein steam and/or nitrogen is used as the stripping gas.

3. The process as claimed in claim 1, wherein a value for $c_{NB,WW2}$ is determined independently at two or more measuring points and the obtained measured values are used to form an average which is used as the value for $c_{NB,WW2,ACTUAL}$.

4. The process as claimed in claim 3, wherein in the event of failure of one or more of the two or more measuring points, but not of all of the measuring points, only the at least one measuring point remaining functional is used, wherein the process comprises at least one such failure during the continuously performed stripping.

5. The process as claimed in claim 1, wherein in the event of failure of each measuring point, the last value for the reduced or increased flow rate $\dot{m}_{SG1}$ to be supplied to the stripping column according to the controlling of step (ii) that was determined from the measured value of a measuring point before its failure, is increased by 5% to 10% and maintained until at least one of the measuring points is functional again.

6. The process as claimed in claim 1, wherein in step (i) $\dot{m}_{SG1}$ is selected for $\dot{m}_{WW1}(t_i)$ in such a way that $\dot{m}_{SG1}$ is within a range of values that is generated by the mathematical relationship (0), which corresponds to $c_{NB,WW2,TARGET}$, and the second mathematical relationship (2) at $\dot{m}_{WW1}(t_i)$ occurring at the time $t_i$.

7. The process as claimed in claim 1, wherein in step (i) $\dot{m}_{SG1}$ is selected $\dot{m}_{WW1}(t_i)$ occurring at the time $t_i$ in such a way that $\dot{m}_{SG1}$ is within a range of values that is generated by the mathematical relationship (0), which corresponds to $c_{NB,WW2,TARGET}$, and the first mathematical relationship (1) at $\dot{m}_{WW1}(t_i)$ occurring at the time $t_i$.

8. The process as claimed in claim 1, wherein the set of linear mathematical relationships includes a third linear mathematical relationship for a third value of $c_{NB,WW2}$, which corresponds to 99% of $c_{NB,WW2,TARGET}$, and a fourth linear mathematical relationship for a fourth value of $c_{NB,WW2}$, which corresponds to 101% of $c_{NB,WW2,TARGET}$, wherein in step (i) $\dot{m}_{SG1}$ is selected for $\dot{m}_{WW1}(t_i)$ occurring at the time $t_i$ in such a way that $\dot{m}_{SG1}$ is within a range of values that is generated by the third mathematical relationship and the fourth mathematical relationship at $\dot{m}_{WW1}(t_i)$ occurring at the time $t_i$.

9. The process as claimed in claim 1, wherein a set of linear mathematical relationships is stored for each of at least two combinations of boundary conditions of (a) $c_{NB,WW1}$, (b) $T_{WW1}$ and (c) $T_{SG1}$, wherein at least $T_{SG1}$ differs in the at least two combinations of boundary conditions.

10. The process as claimed in claim 1, wherein the wastewater stream to be purified is obtained in the washing of a nitrobenzene phase, wherein the nitrobenzene phase is obtained by nitration of benzene with nitric acid in the presence of sulfuric acid followed by separation of an aqueous sulfuric acid phase.

11. The process as claimed in claim 10, wherein the washing of the nitrobenzene phase comprises three stages, wherein the first stage comprises washing with water, the second stage comprises washing with an aqueous base solution and the third stage comprises washing with water, wherein wastewater is generated in each of the three stages and at least one of these is purified in the stripping column as WW1.

12. The process as claimed in claim 1, wherein $c_{NB,WW2,MAX}$ is in the range from 2.0 ppm to 10 ppm based on the total mass of WW2.

13. The process as claimed in claim 1, wherein $c_{NB,WW2}$ is measured continuously or at intervals of not more than 6 hours.

* * * * *